(12) United States Patent
Wallach et al.

(10) Patent No.: US 8,781,862 B1
(45) Date of Patent: Jul. 15, 2014

(54) INSURANCE INCENTIVE PROGRAM FOR PROMOTING THE PURCHASE OR LEASE OF AN AUTOMOBILE

(75) Inventors: Robert Wallach, Mill Neck, NY (US); Jasper Jackson, Montclair, NJ (US)

(73) Assignee: Disruptive Technologies, Ltd., Locust Valley, NY (US)

( * ) Notice: Subject to any disclaimer, the term of this patent is extended or adjusted under 35 U.S.C. 154(b) by 782 days.

(21) Appl. No.: 12/890,517

(22) Filed: Sep. 24, 2010

Related U.S. Application Data

(63) Continuation of application No. 09/645,020, filed on Aug. 23, 2000, now abandoned.

(51) Int. Cl.
*G06Q 40/00* (2012.01)

(52) U.S. Cl.
USPC ......... 705/4; 705/14; 705/5; 705/10; 705/500

(58) Field of Classification Search
USPC .......................................... 705/10, 500, 4, 14
See application file for complete search history.

(56) References Cited

U.S. PATENT DOCUMENTS

| | | | | |
|---|---|---|---|---|
| 5,797,134 A | * | 8/1998 | McMillan et al. | 705/400 |
| 5,950,169 A | * | 9/1999 | Borghesi et al. | 705/4 |
| 6,233,563 B1 | * | 5/2001 | Jefferson et al. | 705/4 |
| 6,347,302 B1 | * | 2/2002 | Joao | 705/36 R |
| 2002/0116228 A1 | * | 8/2002 | Bauer et al. | 705/4 |

* cited by examiner

*Primary Examiner* — Vanel Frenel

(57) ABSTRACT

Included in the terms of a purchase or lease agreement, particularly pertaining to automobiles, a party having a business relationship with the seller or lessor, or the seller or lessor itself, agrees to provide a policy, including at least collision and/or comprehensive coverage, to a qualified buyer. The insurance coverage protects against losses related to the item being purchased or leased for a predetermined period of time. To be qualified, the purchaser or lessor must reside in a particular geographic region and purchase or lease, for example, a particular make and model of automobile. No further characteristics of the purchaser or lessor are considered in obtaining the insurance policy. The sale or lease of the item and provision of the insurance policy may be completed over a computer network, such as the Internet.

1 Claim, 7 Drawing Sheets

INSURANCE INCENTIVE PROGRAM FOR PROMOTING THE PURCHASE OR LEASE OF AN AUTOMOBILE

CLAIM FOR PRIORITY

This application is a continuation of and claims priority under 35 U.S.C. §120 to U.S. application Ser. No. 09/645,020, filed Aug. 23, 2000, titled "Insurance Incentive Program for Promoting the Purchase or Lease of an Automobile." The entirety of the aforementioned application is hereby expressly incorporated by reference.

CROSS-REFERENCE TO RELATED APPLICATIONS

This application is related to U.S. patent application Ser. No. 09/645,794 (U.S. Pat. No. 7,349,860) entitled "Insurance Incentive Program Having a Term of Years for Promoting the Purchase or Lease of an Automobile" filed on Aug. 24, 2000, and is further related to co-pending U.S. patent application Ser. No. 09/645,795 entitled "Insurance Incentive Program for Promoting the Purchase Or Release of an Automobile After an Expiration of a Lease" filed on Aug. 24, 2000, and is further related to co-pending U.S. patent application Ser. No. 11/776,512, entitled "Insurance Incentive Program Having A Term Of Years For Promoting The Purchase Or Lease Of An Automobile" filed on Jul. 11, 2007, and is further related to co-pending U.S. patent application Ser. No. 11/776,507, entitled "Insurance Incentive Program For Promoting the Purchase or Release of an Automobile After An Expiration of a Lease", filed on Jul. 11, 2007, and further related to U.S. patent application Ser. No. 11/776,502 (U.S. Pat. No. 7,801,750), titled "Insurance Incentive Program for Promoting the Purchase or Lease of an Automobile," filed on Jul. 11, 2007, the entirety of each being incorporated herein by reference.

FIELD OF THE INVENTION

The present invention is directed generally to sales incentive programs, and more particularly to sales incentive programs in which insurance is provided to the buyer for an item subject to sale or lease, such as an automobile.

BACKGROUND OF THE INVENTION

It is common for manufacturers or retailers to provide incentives to potential purchasers or lessees in order to increase the sale or lease of an item. Particularly with respect to the sale or lease of automobiles, manufacturers have offered lowered interest rates on financing, rebates and extended warranties in an attempt to increase sale or lease of one or more classes of automobile.

One typical problem faced by purchasers or lessees of automobiles, in particular, is obtaining insurance for the automobile at the time of sale or lease. The buyer must typically complete many forms to obtain the insurance. Such a process may deter the buyer from completing the sale or lease. Furthermore, the characteristics of the purchaser, such as the age, sex, marital status, area of residence, vehicle usage, the number of drivers living with the buyer and the make and model of the car purchased are all considered by an insurance provider to determine a rate for an insurance premium for the insurance policy sought. The cost of the insurance policy may be prohibitive, thereby impacting sale or lease of that class of automobile.

In order to address the problems in obtaining insurance, some automobile retailers have offered to provide basic insurance coverage with the sale or lease of the automobile. However, the premium for the buyer is still evaluated using all of the characteristics identified above, which may result in insurance premiums which are prohibitive for the party receiving the policy. Furthermore, under such programs, the buyer must still complete many forms in order to receive the insurance and must pay a percentage of the premium in advance in order to complete the sale or lease of the vehicle in accordance with certain state laws.

SUMMARY OF THE INVENTION

The present application is directed to particular features of a system and method of providing an incentive to purchase or lease an automobile by providing insurance as a no-cost, or discounted cost "sticker item" on the vehicle at the time of sale or lease.

In particular, one aspect of the invention includes a method for providing an incentive relating to a sale or lease of an item. In this embodiment, a manufacturer determines a class of items for which insurance is to be provided. The manufacturer further determines a geographic region in which a buyer of one of the class of items must reside to receive the insurance. At the time of a sale or lease of one of the class of items, the manufacturer pays an insurance premium for an insurance policy on behalf of the buyer.

In a second embodiment of the present invention, a method for providing an incentive relating to a sale or lease of an item includes a retailer receiving an indication of a class of items for which insurance is to be provided to a buyer residing in a geographic region without cost to the buyer. The retailer completes a sale or lease of one of the class of items to a particular buyer residing in the geographic region and confirms that the buyer resides in the geographic region. The retailer then provides a sales agreement relating to the sale or lease of the item to the buyer. The sales agreement includes a confirmation of a provision of an insurance policy covering the item.

According to a third embodiment of the present invention, a method for providing an insurance policy relating to a sale or lease of an item begins when an insurance affiliate receives an indication of an item sold to a buyer for which insurance is provided by a third party. The affiliate charges a premium for the insurance policy to the third party, the premium based on a class of the item and a geographic region of the buyer without consideration of further qualifications of the buyer.

According to a fourth embodiment of the present invention, a method for deter mining an insurance premium to be charged to a party providing insurance to a buyer of an item begins when an affiliate receives from a manufacturer an indication of a class of items for which insurance is to be provided to a buyer of one of the class of items. The affiliate further receives from the manufacturer an indication of a geographic region in which a buyer must reside to receive the insurance. Based on this data, the affiliate calculates a premium to be charged for each insurance policy issued to purchasers or lessees in the geographic area, the premium being based on the class of items and the geographic region, without consideration of further characteristics of the buyer.

According to a fifth embodiment of the present invention, a method of receiving an insurance policy with a sale or lease of an item begins when a buyer completes a sale or lease agreement for either a purchase or a lease of an item. The buyer then receives a paid insurance policy for the item, the insurance policy being provided based on a class of the item and the geographic location in which the buyer resides.

According to further embodiments of the present invention, the item being purchased or leased may be an automobile of a particular make and model. The insurance policy may cover comprehensive, collision and other types of losses relating to the item and may remain in effect even after the buyer moves from the geographic region. Also, the insurance affiliate may charge the manufacturer a flat rate for each policy issued according to the incentive program.

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

According to various embodiments of the present invention, an improved incentive program is introduced for promoting the sale or lease of an item. As used herein, the terms "sale," "sell," "selling," "sold," "buy" and "buying" refer to any of a purchase of an item, a purchase of an item with financing or a lease of an item. The item may be a product produced by a manufacturer, or any product or service offered for sale or lease by a retailer. Whether the item is purchased or leased, the purchaser or lessee shall be uniformly referred to herein as a "buyer" or "customer."

In preferred embodiments, the item that is sold is an automobile of a particular make and model. The automobile may be new or used as those terms are understood by one of ordinary skill in the art.

Figure 1:
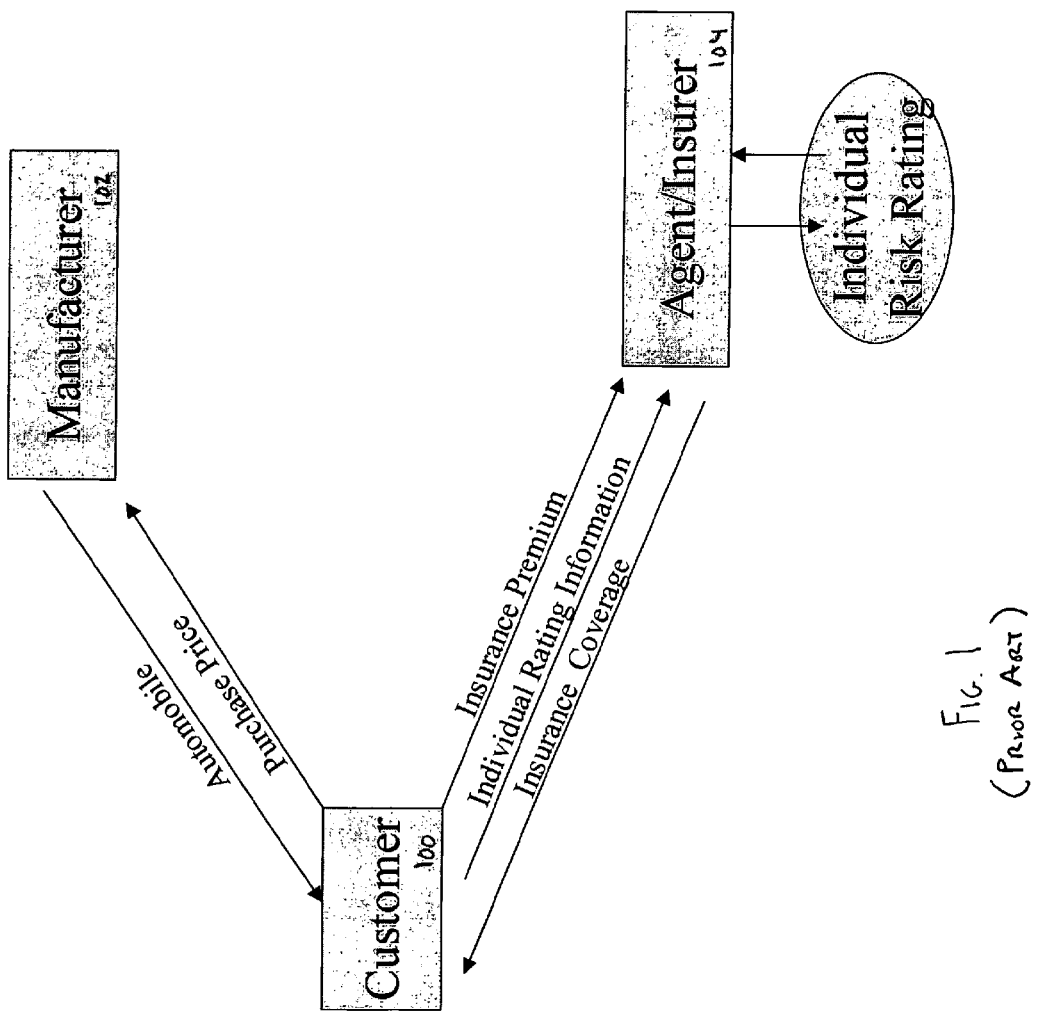
FIG. 1 is a block diagram illustrating an exemplary relationship between manufacturers, retailers, purchasers, insurers, and underwriters of the prior art.

The advantages of the systems and methods of the present invention over prior programs are exemplified in FIG. 1. In typical sale or lease of an automobile, a buyer 100 pays a purchase price to a manufacturer 102 for a particular make and model of an automobile offered for sale or lease. The transaction may take place through an intermediary, such as an automobile dealer or an operator of a web site on the Internet (not shown). In consideration of most states' requirements that automobiles have at least minimum insurance coverage, before delivery of the automobile to the buyer can be completed, the buyer 100 must secure an insurance policy for the automobile. This can be accomplished through an automobile dealership working in conjunction with a third party insurer 104, or the buyer may separately obtain insurance coverage from an insurer 104, and provide confirmation thereof, prior to receiving the automobile.

In either event, the insurer 104 will determine an individual risk rating for the buyer 100 based on certain characteristics of the buyer 100. These characteristics typically include all of the following factors: the age of the buyer 100, the sex of the buyer 100, the contemplated usage of the vehicle (business, personal, miles to be driven per day, etc.), the rating territory (broken down by city, state and/or zip code, or any portion thereof) in which the vehicle will be garaged, known risk factors associated with each rating territory (i.e. rate of theft or accident within each rating territory), the driving history of the buyer 100 (i.e. the number of traffic violations and/or accidents in a preceding period of time), the number of persons of legal driving age residing with the buyer 100, and statistics relating to the model of automobile to be purchased (i.e. rate of theft and accidents involving the model).

The buyer 100 will also identify the types of insurance coverage desired for the automobile. Typically, insurers offer six categories of coverage, some of which are mandatory by various state governments. These include: (1) bodily injury liability, for injuries the insured causes to another party; (2) personal injury protection (i.e. no-fault coverage), for medical expenses and lost wages relating to the treatment of injuries to the driver and passengers of the insured's automobile; (3) property damage liability, for damage caused by the insured to another's property; (4) collision coverage, for damage to the insured's car resulting from a collision with another car or object; (5) comprehensive coverage, for damage to the insured's car that doesn't involve a collision (i.e., fire, theft, falling objects, and acts of God); and (6) uninsured motorist coverage, for treatment of an insured's injuries as a result of a collision with an uninsured driver.

Typically, insurance premiums may be discounted based on certain discount factors, such a clean driving and accident record, multiple automobile coverage, automobile coverage in conjunction with other types of insurance (such as homeowners insurance), and safety factors included or added to an automobile, such as air bags, anti-theft devices, use of seat belts and the like.

From the risk factors, the selected insurance coverage and the discount factors, as well as costs and expenses borne by the insurance carrier, an individual premium is calculated by the insurer 104.

The lengthy process of obtaining insurance and the cost of the insurance itself, may be prohibitive to the buyer 100, and may influence the buyer's 104 decision to purchase an automobile. Furthermore, a retailer, such as an automobile dealer, may require an insurance deposit of 10-20% of the premium at the time of sale or lease to secure an insurance policy for a predetermined period of time, for policies secured with the aid of the retailer. This increases costs to the buyer 100, and again, may impact the decision to purchase the automobile.

Referring now to FIGS. 2-7, wherein similar components of the present invention are referenced in like manner, preferred embodiments of an insurance incentive program for promoting the purchase or lease of an item, such as an automobile, are disclosed.

Figure 2:
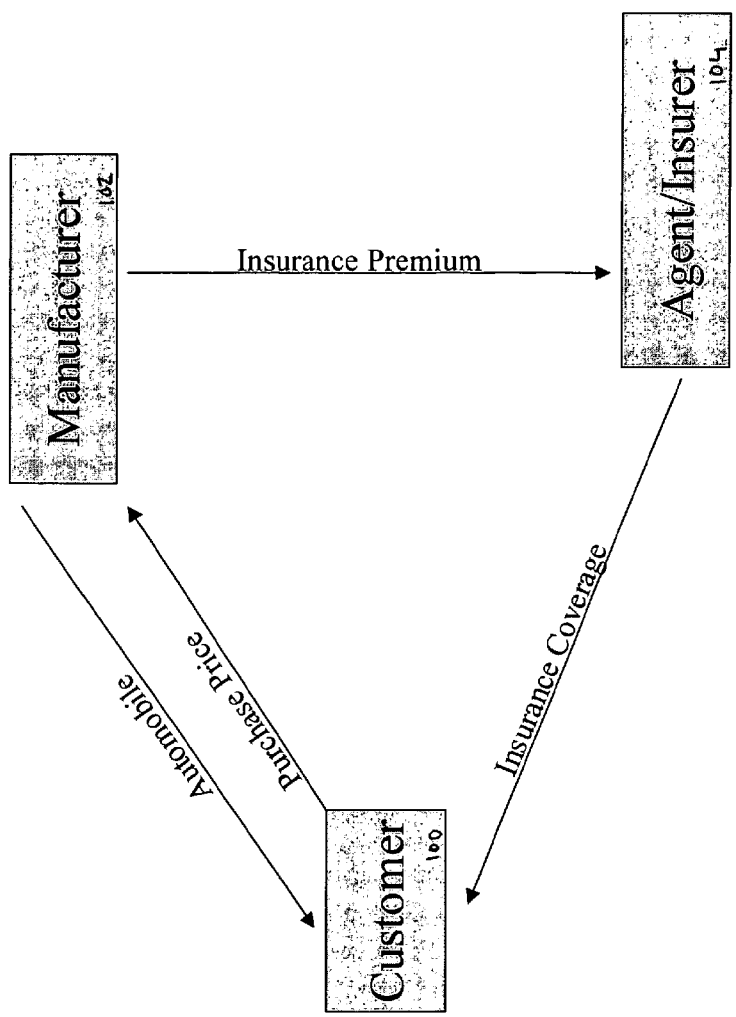
FIG. 2 is a block diagram illustrating an exemplary relationship between manufacturers, retailers, purchasers, insurers and underwriters according to the present invention.

FIG. 2 schematically depicts the transactions that take place between buyer 100, manufacturer 102 and insurance agent 104 according to certain embodiments for the present invention. In general, it is contemplated that a manufacturer 102, or dealers/retailers having a business relationship with the manufacturer, will select a product and promote sale or lease thereof through offering a sales incentive as described herein. In particular, it is contemplated that a manufacturer of automobiles may, based on projected or current sale or lease figures, select one or more makes and models of automobile that are subject to the sales incentive. In order to increase sale or lease of the selected makes and models, the manufacturer 102 may offer a program whereby a qualified buyer would receive a discounted or fully-paid insurance policy with the sale or lease of the automobile. This incentive may be provided in addition to or in place of offering standard sales incentives such as rebates, lowered financing interest rates and extended warranties.

Accordingly, a transaction according to this sales incentive will resemble that depicted in FIG. 2. The buyer 100 pays a purchase price (or alternatively enters into a financing or lease agreement) to buy a selected automobile from the manufacturer 102, or a retailer, such as an automobile dealership having a business relationship with the manufacturer. The manufacturer 102 or retailer notifies a selected insurer 104 of the sale or lease and secures an insurance policy on behalf of the buyer. The insurer 104 may be an affiliate of the manufacturer, as described further below. Furthermore, the insurance policy may be provided on the basis of the make and model of the automobile being purchased and the geographic area where the buyer resides, without consideration of further characteristics of the driver, also as described further below. Upon delivery of the automobile to the buyer 100, the buyer 100 receives fully paid insurance coverage from the insurer 104.

Figure 3:
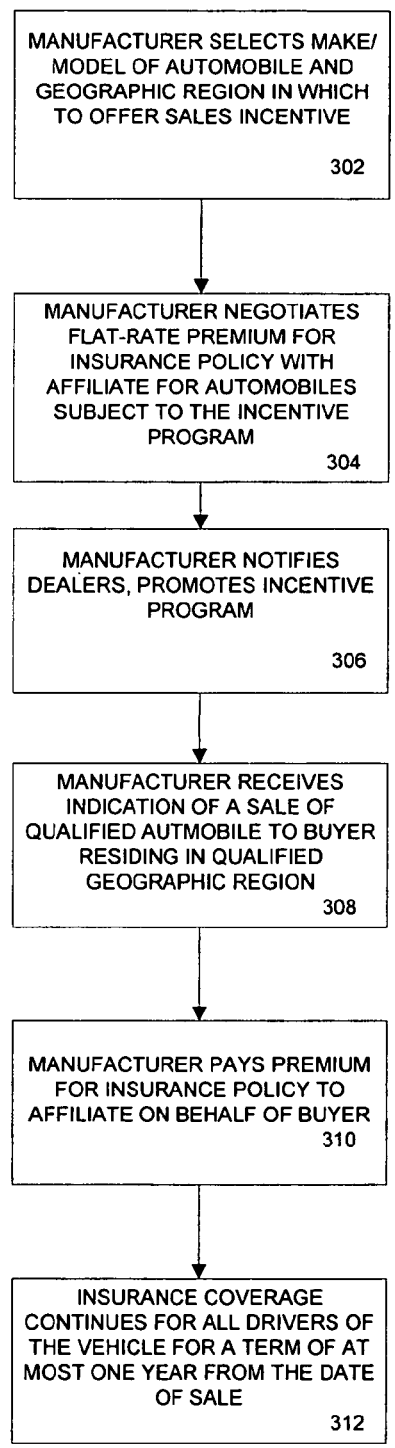
FIG. 3 is a flow chart of an exemplary process, performed by a manufacturer of an item, to provide a sales incentive for the purchase or lease of the item.

Turning now to FIG. 3, therein is depicted an exemplary process 300 for offering a sales incentive and completing a sale or lease of an item according to one embodiment of the present invention. The process 300 begins when a manufacturer selects one or more makes and models of automobile and at least one geographic region in which to offer a sales incentive (step 302).

The selection of the make and model of automobile may be made based upon several factors. Since maintaining a surplus inventory is costly to both manufacturers and retailers, it is contemplated that those makes and models of automobile for which sales are under-performing may be selected for the sales incentive. Alternatively, or in addition, it is contemplated that those makes and models for which a new model year is approaching may be a candidate for the sales incentive program. Other factors in making the selection may be based on competition in the marketplace, i.e. trying to gain an advantage on a competing make and model of car from another manufacturer. Additional factors in making the selection of an automobile may be used.

The selection of a geographic region may also be made based on several business factors. One such factor is lower sales of the make and model in a particular geographic region, such as a state, a county, a city, town or village, a zip code, or any portion thereof. Another factor may be based on demographic and other statistics relating to a particular geographic region. For example, a particular geographic region may be disqualified from the program based on the rate of car theft, accidents or vandalism in the area. Other factors may also be included in the selection of geographic areas in which the sales incentive is to be offered.

Continuing with process 300, the manufacturer 102 next negotiates the terms of insurance to be provided according to the sales incentive with the insurer 104 (step 304). In a preferred embodiment, the insurer 104 is an affiliated company related to the manufacturer 102. However, the insurer 104 may be an insurance carrier or agent. It is preferable that the types of insurance coverage, such as personal and bodily injury, liability, property damage, comprehensive, collision and uninsured motorist coverage all be provided to a buyer under the program. However, any useful subset of these coverages may be agreed upon. It is also preferable that the manufacturer be charged a flat rate for each policy initiated under the sales incentive so that costs of the incentive to the manufacturer may be more easily predicted and so that buyers may be more readily qualified without regard to individual characteristics. The determination of the flat rate for the insurance premium is discussed in more detail below with respect to FIG. 5.

Next, at step 306, the manufacturer 102 may notify retailers of the selected make and model in the selected geographic area(s) which qualify for the sales incentive program. The manufacturer 102 may further initiate television, radio and/or print advertising notifying the public as to the sales incentive.

After the sales incentive has been initiated, the manufacturer may next receive an indication of a sale or lease of a qualified automobile to a qualified buyer (step 308). The manufacturer may then pay an insurance premium on behalf of the buyer according to the sale incentive program (step 310). The insurance preferably takes place at the time of sale or lease of the automobile or the time of delivery of the automobile to the buyer (step 312). The insurance policy preferably covers all drivers of the vehicle for a period of one year from the date of sale, lease or delivery, although any term of insurance may be provided. The process 300 then ends.

Figure 4:
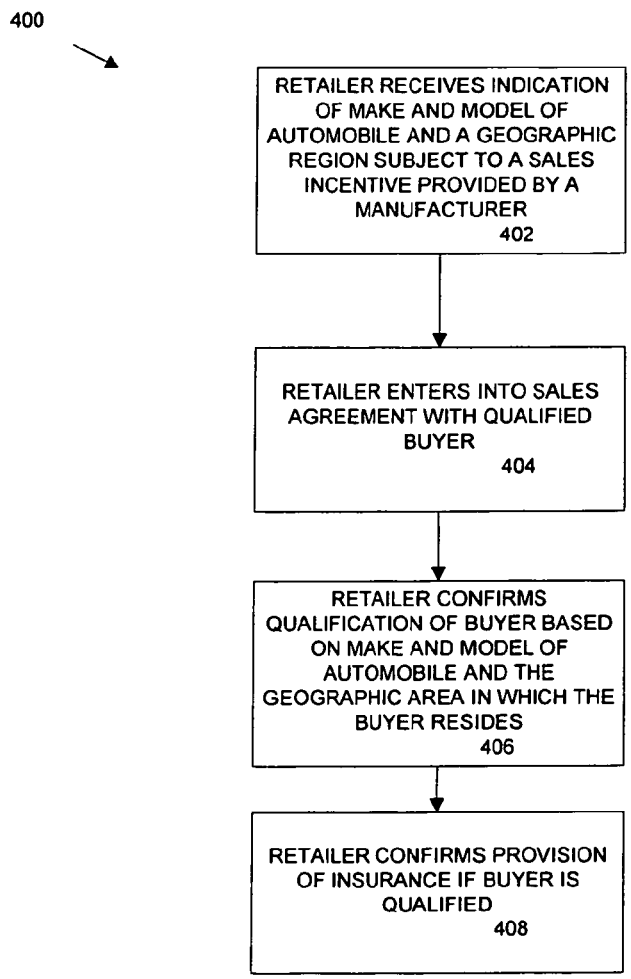
FIG. 4 is a flow chart of an exemplary process, performed by a retailer of an item, to provide a sales incentive for the purchase or lease of the item.

Turning now to FIG. 4, therein is depicted a process 400 by which a retailer may complete a sale or lease of a qualified make and model of automobile to a qualified buyer. The process 400 begins when the retailer receives an indication of qualified makes and models and qualified geographic regions according to the sales incentive program, as determined by the manufacturer 102 (step 402). The retailer may be provided with all the forms, manuals and guidelines required to successfully complete a sale or lease according to the program.

Next, the retailer may enter into a sale or lease transaction with a qualified buyer for a qualified automobile (step 404). The transaction may be embodied in one or more forms comprising a sales agreement for the lease or purchase of a vehicle in which the terms of the sale or lease are incorporated. During the sale or lease, the retailer may confirm that the buyer lives in the required geographic region by reviewing the buyer's current drivers license or other proof of address, such as a credit report (step 406). The retailer then provides the confirmation to the manufacturer and confirms the provision of a discounted or fully-paid insurance policy to the buyer (step 408), after which process 400 ends.

Figure 5:
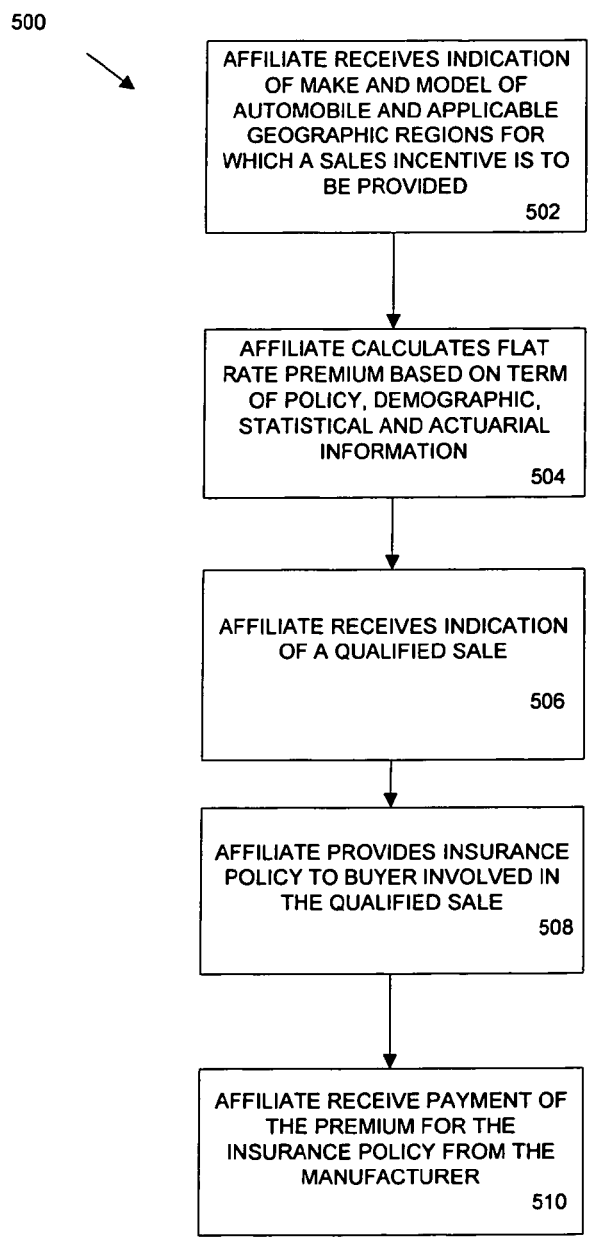
FIG. 5 is a flow chart of an exemplary process, performed by an insurance affiliate, to provide an insurance policy corresponding to a sales incentive for the purchase or lease of an item sold by a manufacturer or retailer.

Referring now to FIG. 5, therein is depicted an exemplary process 500 performed by an insurer 104 for determining and providing an insurance policy according to the sales incentive program described above. As stated above, it is preferred, though not required, that the insurer 104 providing insurance coverage according to the sales incentive program be an affiliate of the manufacturer 102. This relationship has the advantage of providing an amicable business relationship while satisfying many state requirements that prohibit a licensed entity from dispensing free insurance, since the premium will be paid to the insurer 104 by the manufacturer.

The process 500 begins when the insurer 104 receives an indication of one or more makes and models of automobile and one or more geographic areas in which the manufacturer 102 will provide the above-described sales incentive (step 502). Based on this information, the insurer 104 preferably calculates a flat rate for each insurance policy to be issued in each geographic region (step 504).

The provision of a flat-rate insurance policy represents a divergence from standard insurance practices, in which premiums are typically calculated based on individual characteristics of the buyer, as described above. However, it is contemplated that use of regional demographic, statistical and actuarial information may be used to calculate a flat rate premium without consideration of further individual statistics such as age, sex, marital status, vehicle usage and driver history. For example, the insurer 104 may rely on average statistics for a geographical region relating to occurrences of automobile accidents, theft, vandalism and other losses for each identified make an model of automobile, or similar automobiles in the region in order to calculate a flat-rate premium.

The insurer 104 may further use average premium information as compiled by the National Association of Insurance Commissioners to determine an acceptable flat-rate premium. The insurer 104 may further account for the number of projected insurance policies that may be issued under the program, the type of coverages to be initiated under the policy, the demographics of expected buyers of the make and model of automobiles subject to the program, expected or actual costs and expenses relating to the program and the term of the policy to calculate the premium. Other known actuarial and statistical information and techniques may readily be employed.

Next, after the premium rates have been successfully negotiated and the program has been implemented, the insurer 104 may receive an indication of a qualified sale or lease under the program (step 508). The insurer 104 may then provide an insurance policy to the buyer at the time of sale, lease or delivery of the vehicle (step 510), after which, the insurer 104 receives a payment of the premium from, for example, the manufacturer 102 or the retailer on behalf of the buyer (step 512). The process 500 then ends.

Figure 6:
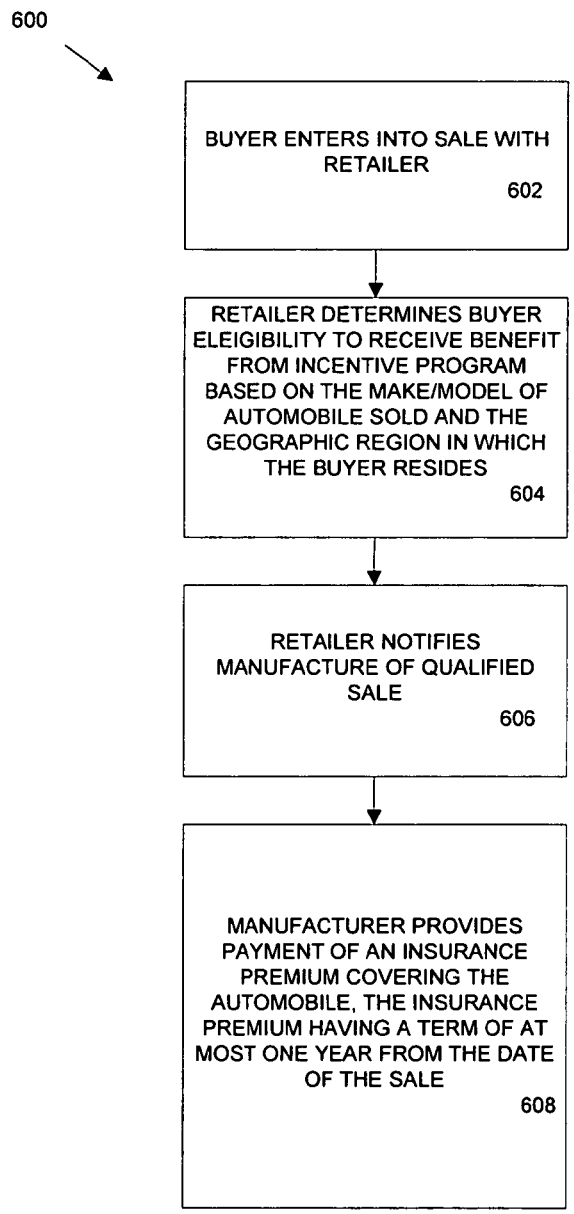
FIG. 6 is a flow chart of an exemplary process, performed by a buyer of an item, to receive an insurance policy with the purchase or lease of the item.

Turning now to FIG. 6, therein is depicted a process 600 by which a qualified buyer 100 receives an insurance policy with a sale or lease of a qualified automobile according to the sales incentive program described above. The process 600 begins at step 602 where the buyer enters into a sale or lease with a retailer selling the qualified automobile. It is further contemplated that the sale or lease may be made by the manufacturer 102 directly. The retailer determines the eligibility of the buyer 100 to receive insurance under the sales incentive program based on the type of automobile sold and the geographic region in which the buyer resides (step 604) and notifies the manufacturer 102 of the qualified sale or lease (step 606). The manufacturer 102 then provides a payment of at least a portion of the insurance premium to the insurer 104 on behalf of the buyer 100 (step 608), thereby giving the buyer a discounted or fully-paid insurance policy covering the automobile against certain types of losses. The process 600 then ends.

Figure 7:
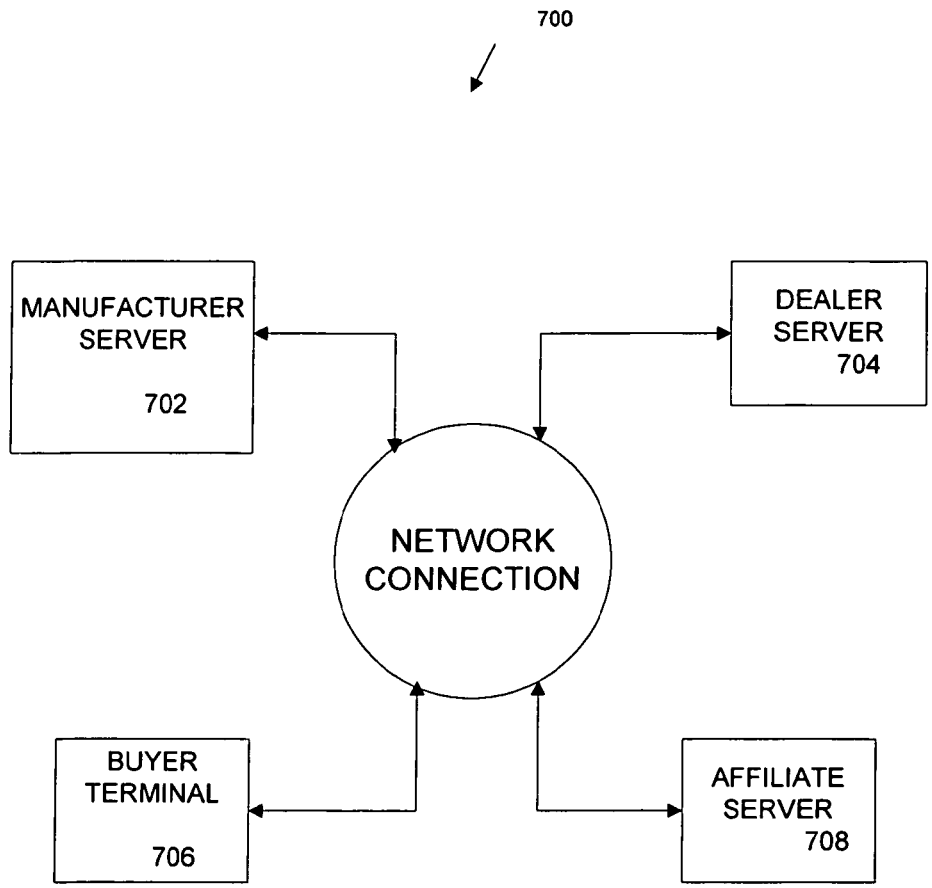
FIG. 7 is a block diagram representing an exemplary computer network for completing the provision of an insurance policy for an item sold to a buyer.

Turning to FIG. 7, it is contemplated that all the transactions described above may be implemented on a computer network 700 or series of such networks, such as the Internet or World Wide Web. In such an embodiment, the manufacturer 102 may have one or more computer servers 702 on the network 700 for providing information on available makes and models of automobiles, completing direct sale or lease of such automobiles and completing such transactions in accordance with the sales incentive program described above. It is contemplated that one or more retailers may further have similar servers 704 on the network 700 for accomplishing the same, in addition to, or in lieu of, manufacturer servers 702.

The insurer 104 may operate an insurance affiliate server 708 for performing the steps described above with respect to FIG. 5. The affiliate server 708 may further handle insurance transactions directly with a buyer 100, such as processing claims, providing teens of insurance or handling buyer inquiries.

The buyer 100 may communicate with the manufacturer server 702, the dealer server 704 and/or the affiliate server 708 using a buyer terminal 706 to complete a purchase of the automobile, receive the benefit of the sales incentive program and communicate above-described insurance transactions.

Each of the servers 702, 704, 706 may be operative to communicate over the network 700 in any manner known in the art and are preferably operative to handle high-bandwidth communications from multiple buyers 100 simultaneously. The buyer terminal 706 may be any personal communications device operative to communicate over network 700, such as a personal computer with the ability to handle network communications, as well as, personal workstations, network terminals, personal digital assistants (PDAs), cellular telephone equipped with wireless interne access or any other similar hard-wired or wireless communications equipment.

In addition to the above features, there are several additional embodiments contemplated to be within the scope of the present invention. For example, it is contemplated that the provision of the insurance policy under the sales incentive program may be discounted or free to the buyer 100. However, if the buyer incurs substantial losses relating to the automobile within a particular period of time, it is contemplated that an additional charge may be levied upon the buyer 100 to continue the insurance coverage. It is further contemplated that the term of the provided insurance may be at most one year from the date of sale, lease or delivery of the vehicle. However, other policy terms may likewise be used.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A processor-implemented method for providing an incentive relating to a sale or lease of an item, comprising:
   receiving an indication of an item sold to a buyer or leased to a lessee for which insurance is provided by a third party;
   determining, via a processor, a class of items for which insurance is to be provided with a sale or lease of one of the class of items;
   determining a geographic region in which a buyer of one of the class of items must reside to receive the insurance; and
   paying an insurance premium for an insurance policy on behalf of the buyer, the insurance policy covering an item from the class of items after a sale or lease of the item to the buyer residing in the geographic region.

* * * * *